July 17, 1923.
B. F. SEYMOUR
1,462,384
COMBINED RESILIENT BEARING AND TRANSMISSION
Filed Nov. 8, 1919
2 Sheets-Sheet 2
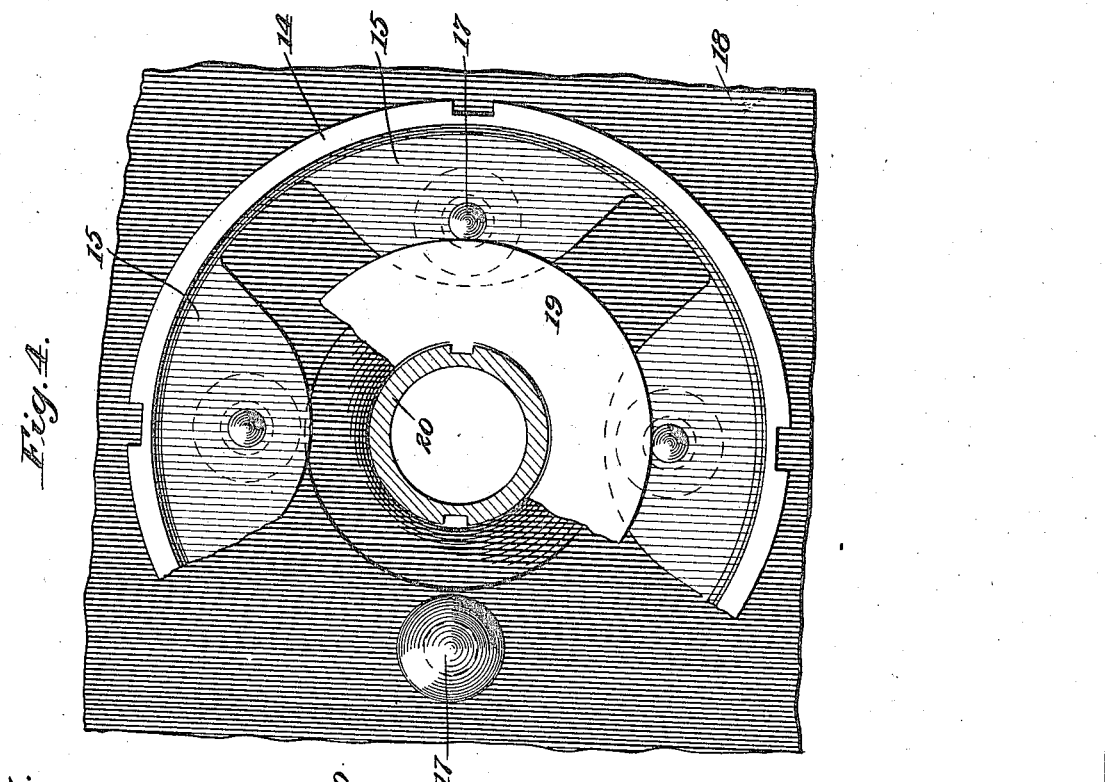
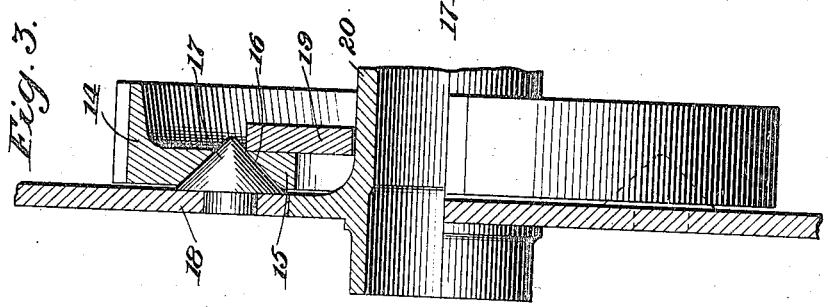

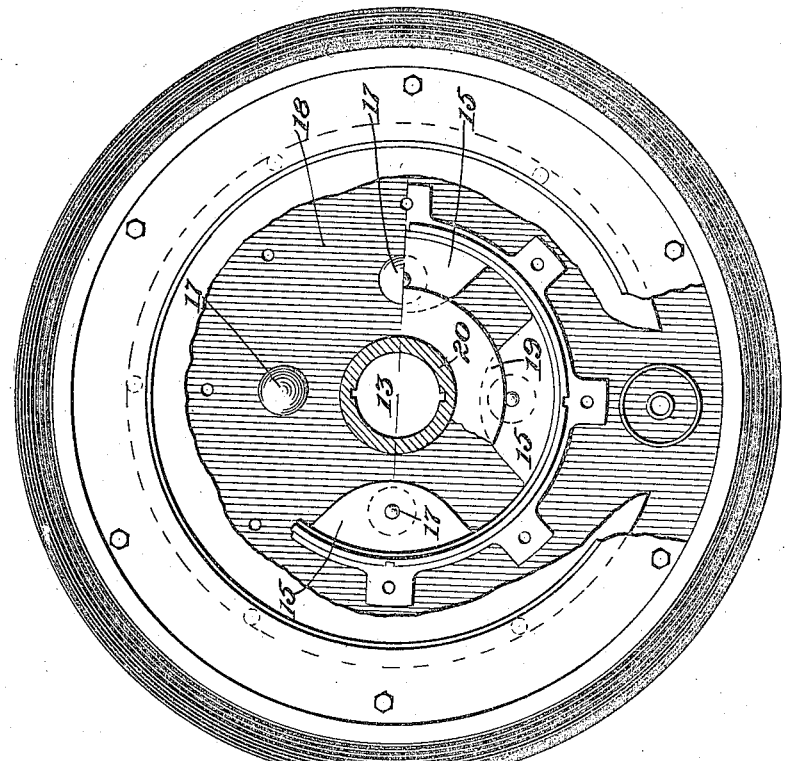

Patented July 17, 1923.

1,462,384

UNITED STATES PATENT OFFICE.

BENJAMIN F. SEYMOUR, OF WASHINGTON, DISTRICT OF COLUMBIA.

COMBINED RESILIENT BEARING AND TRANSMISSION.

Application filed November 8, 1919. Serial No. 336,632.

*To all whom it may concern:*

Be it known that I, BENJAMIN F. SEYMOUR, a citizen of the United States, residing at Washington, in the District of Columbia, have invented certain new and useful Improvements in Combined Resilient Bearings and Transmissions; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my co-pending applications for United States patents bearing the Serial Nos. 302,415; 302,416; 310,970; 322,627 and dated respectively June 7, 1919; June 7, 1919; July 15, 1919; Sept. 9, 1919.

The arrangement shown herein is further characterized in that uniformly distributed and co-operable cone elements are provided for the driving and driven element to the end of obtaining equal and uniformly distributed pressure under all working conditions, whereby to obtain maximum efficiency and ease of operation.

The invention is shown by way of illustration in the accompanying drawings wherein, Figure 1 is a central sectional view showing the application of the device to a vehicle wheel, Figure 2, a side elevational view thereof, Figure 3 an enlarged detail view, partly in section of the transmitting and bearing elements per se, and Figure 4 is a similar view thereof taken at right angles to Figure 3.

Referring to the construction in further detail and wherein like reference characters designate corresponding parts, the construction consists of a hub portion formed of two side plates, or housing members, 5 and 6 which are disposed against the inner rim portion 9 of the wheel, as shown. The two hub members 5 and 6 are secured to the wheel rim by the series of pairs of bolts 10 screwed into threaded sleeves 11 that serve as spacing elements and which are located within the spaces, or chambers, 12, as indicated in Figures 1 and 2. It will be understood, of course, that said spaces 12 are provided to allow the wheel rim to have limited radial movement with respect to the axis 13 of the wheel.

The resilient transmission and bearing device per se consists of a ring or annulus 14 splined or otherwise fitted to have lateral movement on the rim portion 9 within the limits of the side plates or housing members 5 and 6 of the wheel structure. Said ring 14 is formed with a plurality of segmental sections or flanges 15 equally disposed about the circumference of the wheel, each of which has formed therein a conical shaped recess or aperture 16 adapted to receive and co-act with the cone heads 17 that are fixedly mounted in the flange portion 18 of the hub structure, as shown. The ring 14 is normally in lateral bearing relation to the inner side plate 6.

A collar 19 axially movable on the hub portion 20 is held in close contact with the segmental portions 15 of the ring 14 by the spring 21, and through the tension of this spring said cone elements (16 and 17) are held in co-operative relation and under the required tension.

An adjustable collar 22, screw threaded on the hub portion 20, serves for regulating the tension on said spring and the removable closure plate 23 readily permits of access for adjusting said collar 22 as will be understood.

It will therefore be seen from the foregoing that any motion or shock of the shaft or axle will transmit a like movement to the wheel hub through the medium of the co-acting cones, and that such transmission will be flexible or resilient in nature. And it will be further seen that any jarring motion imparted to the wheel will be resiliently taken up by the co-operating cone elements together with the spring.

The invention is not to be understood as being limited to the details of construction herein shown and described, as these may be varied widely without departing from the spirit of the invention.

Having thus described my invention what I claim as new is:

1. In a combined resilient transmission and bearing for vehicle wheels the combination of a hub portion, a wheel rim mounted in bearing relation to the hub adapted to have limited radial movement thereon, a ring mounted to have axial movement on the rim and provided with wedge elements fixedly mounted, wedge elements on the hub co-operable with said ring wedge elements, and resilient means normally holding said wedge elements in co-operative relation, substantially as set forth.

2. In a combined resilient transmission and bearing for vehicle wheels the combination of a hub portion having side plates, a wheel rim mounted to have limited radial movement thereon, a ring mounted in bearing relation to one of said side plates adapted to have axial movement on the rim and provided with wedge elements, fixedly mounted wedge elements on the hub co-operable with said ring wedge elements, and a spring tensioning said ring to hold the wedge elements in co-operative relation, substantially as set forth.

3. In a combined resilient transmission and bearing for vehicle wheels the combination of a hub portion, a wheel rim mounted to have limited radial movement thereon, a ring mounted to have axial movement on the rim and provided with wedge elements, fixedly mounted wedge elements on the hub co-operable with said ring wedge elements, a collar disposed against said ring, and a spring tensioning said collar to hold the wedge elements in co-operative relation, substantially as set forth.

4. In a combined resilient transmission and bearing for vehicle wheels the combination of a hub portion, a wheel rim mounted to have limited radial movement thereon, a ring mounted to have axial movement on the rim and provided with cone shaped recesses, cone members fixedly mounted on the hub co-operable with said recesses, a collar disposed against said ring, and a spring tensioning said collar to hold the wedge elements in co-operative relation, substantially as set forth.

5. In a combined resilient transmission and bearing for vehicle wheels the combination of a hub portion having side plates, a wheel rim mounted to have limited radial movement between the side plates, a ring splined on the rim normally in bearing relation to one of said side plates and movable axially between said side plates, said ring having a plurality of cone shaped recesses; a plurality of cone heads fixedly mounted on the hub and engaging within said recesses, and resilient means normally holding said cone elements in co-operative relation, substantially as set forth.

6. In a combined resilient transmission and bearing for vehicle wheels the combination of a hub portion having side plates, a wheel rim mounted to have limited radial movement between the side plates, a ring splined on the rim and movable between said side plates, said ring having a plurality of cone shaped recesses; a plurality of cone heads fixedly mounted on the hub and engaging within said recesses, a collar slidable on the hub and disposed against said ring, and a spring tensioning said collar against the ring to hold the wedge elements in co-operative relation, substantially as set forth.

In testimony whereof I affix my signature.

BENJAMIN F. SEYMOUR.